United States Patent [19]

Schroeder

[11] 4,388,526

[45] Jun. 14, 1983

[54] MEASURING APPARATUS WITH RESPONSE ADJUSTMENT

[75] Inventor: Eugene N. Schroeder, Lexington, Ky.

[73] Assignee: International Business Machines Corporation, Armonk, N.Y.

[21] Appl. No.: 271,317

[22] Filed: Jun. 8, 1981

[51] Int. Cl.³ .............................................. H01J 40/14
[52] U.S. Cl. ................................ 250/214 R; 250/578; 358/213
[58] Field of Search ................ 250/214 R, 211 J, 578; 357/31, 32; 358/212, 213

[56] References Cited

U.S. PATENT DOCUMENTS 4,136,277 12/1976 Gerrard .............................. 355/68
4,172,659 12/1977 Laska ................................. 250/205

Primary Examiner—David C. Nelms
Assistant Examiner—Darwin R. Hostetter
Attorney, Agent, or Firm—John A. Brady

[57] ABSTRACT

The output (18) from an optical sensor is recharged for a time dictated by the output of the digital-to-analog converter (11). A previous count indicative of the recharge time is stored in memory (52) which controls the converter (11). This count is manipulated in incrementing circuit elements (54) (70 and 72) depending on the time the comparator (12) signals a difference signal, indicative of a period of recharge.

7 Claims, 4 Drawing Figures

MEASURING APPARATUS WITH RESPONSE ADJUSTMENT

TECHNICAL FIELD

This invention relates electrical measuring apparatus employing a capacitor or other current-acceptor as a measurement element. A primarily use of this invention is for optical sensing, in which a charged capacitor is discharged in a circuit modified by a light-responsive element.

BACKGROUND ART

Electrical measuring apparatus, including optical-character-recognition systems, typically employ calibration and adjustment circuits to adjust to variations between sensing elements, in ambient conditions, and among other environmental variables. Typically, the signal for each sensing element is adjusted separately, as the sensing element and the associated circuit elements unique to that element vary significantly in response and characteristics from those of the other sensing elements, even though they are designed to be identical.

Changes in the operative factors may occur continually as a result simply of random variations in the environment, as well as more predictable causes. A major cause of variation is difference in paper characteristic within the same sheet, when printing on the paper is being observed by scanning across the paper.

Depending on the specific problems of a given optical system, adjustment of the sensor with each sensing operation may be desirable. For example, where a white is sensed in an optical system by one sensor and the next sensing is a white significantly more toward white characteristics than the first, adjustment of the sensor to recognize a brighter white as normal may be accomplished. Such continual adjustment as generally conceived forms no part of this invention.

This invention is directed to a specific implementation in which such adjustment is made in a system in which each sensor system includes a current-acceptor such as a capacitor. Adjustment is made by incrementing a count which is the input to an digital-to-analog converter, the output of which controls current into the capacitor.

The use of a count or counter as an input to a digital-to-analog converter is well known in various contexts. Typically, a pulse train has a number of pulses proportional to a number to be digitized. This number may be represent a height of a pulse or the time in a meter. The number of pulses is counted, and the count is the input to the digital-to-analog converter. Documentation representative of this state of the art and also in the field of electrical sensing are U.S. Pat. Nos. 4,172,659 to Laska and 4,136,277 to Gerrard. The capacitive-sensing system employed in the actual embodiments, as described in detail in connection with the first embodiment discussed, is a standard, commercially available scanner and, in itself, forms no part of this invention.

DISCLOSURE OF THE INVENTION

This invention provides a practical system to adjust the sensing status of a capacitive-sensing system. The invention employs only standard circuit elements and can adjust the response by one count-increment, or more than one, depending upon the specific design selected. Typically, adjustment by a single increment per scan provides reliable operation, and in accordance with this invention, the design is simple and effective. Also, this invention provides primarily for digital definition and transmission of data, which reduces error.

In accordance with this invention, a digital-to-analog converter controls the recharging current to a current-accepting capacitor subject to discharge in a sensing operation. This converter is controlled by a count representative of the prior recharging. The current charging is timed up to the limit corresponding to that to fully recharge the capacitor, and, when the time to recharge is different, the count is incremented in a sense to bring the recharging time to a predetermined period. Depending on the specific implementation, incrementing the count may occur with each recharging or only when the sensed result is of a predetermined kind.

BRIEF DESCRIPTION OF THE DRAWINGS

The details of this invention will be described in connection with the accompanying drawing, in which.

BEST MODE FOR CARRYING OUT THE INVENTION

The photosensor array is of standard design and construction, differing from that commercially available only in the recharging circuit elements as will be described in accordance with this invention. As shown somewhat illustratively in FIG. 1, the array comprises a shift register 1 controlling in series a plurality of photodiodes 3 connected in the circuit as will be described. A difference of this invention is that the output is sensed by a comparator, as will be described, while in the prior circuit the sensing is by a differential amplifier.

More specifically, 128 photodiodes exist positioned in column. A document or the like to be examined is positioned with a narrow column in optical communication with the diodes 3. Light reflected from each separate, small area onto an associated diode 3 controls the response of that diode. Accordingly, each diode 3 responds in relation to light reflected from one part of the document column. All of the diodes 3 combined respond to the entire column. The image of the document is moved across the diodes to present adjoining columns in optical communication with the diodes. This is entirely conventional. Each separate area responded to by one diode at one sensing interval is denominated a picture element or pel.

Figure 1:
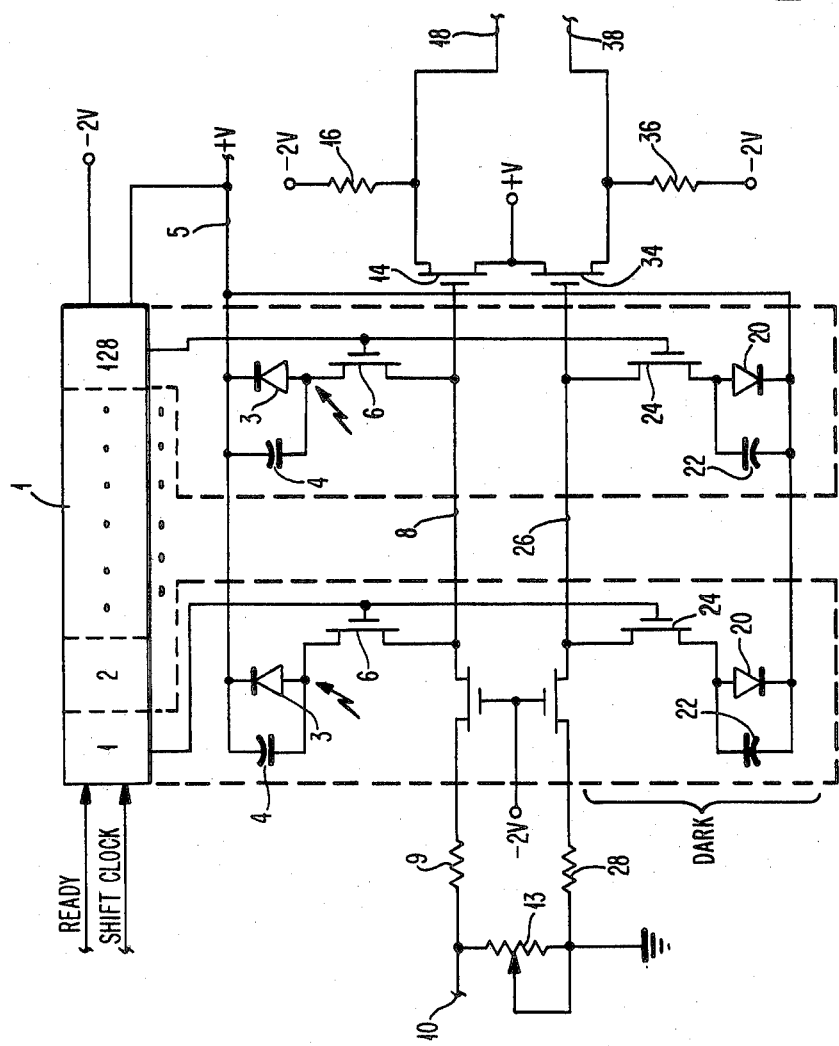
FIG. 1 illustrates the capacitive light sensor employed in all embodiments described.

As shown in FIG. 1, each sensing diode 3 is connected in parallel to a capacitor 4, and their junction is tied to a charging potential +V on line 5. Each such parallel combination is connected through a field effect transistor 6 operative as a switch to a signal line 8 having a resistance 9. Line 8 carries light information and is connected through resistor 9 and line 10 to a digital-to-analog converter 11 (DAC) (FIGS. 2, 3 and 4) as will be described. An adjustable resistance 13 connects the line 10 to ground, forming a current divider to adjust input levels to the scanner.

Figure 2:
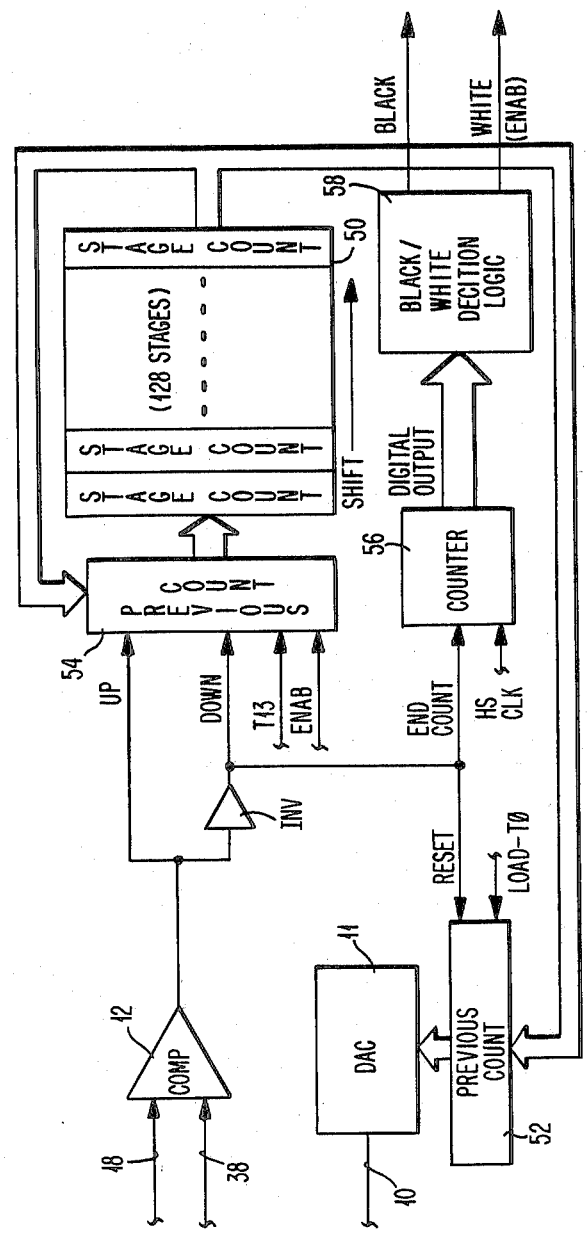
FIG. 2 illustrates an embodiment in which the sensor system is adjusted one increment with each sensing.
Figure 3:
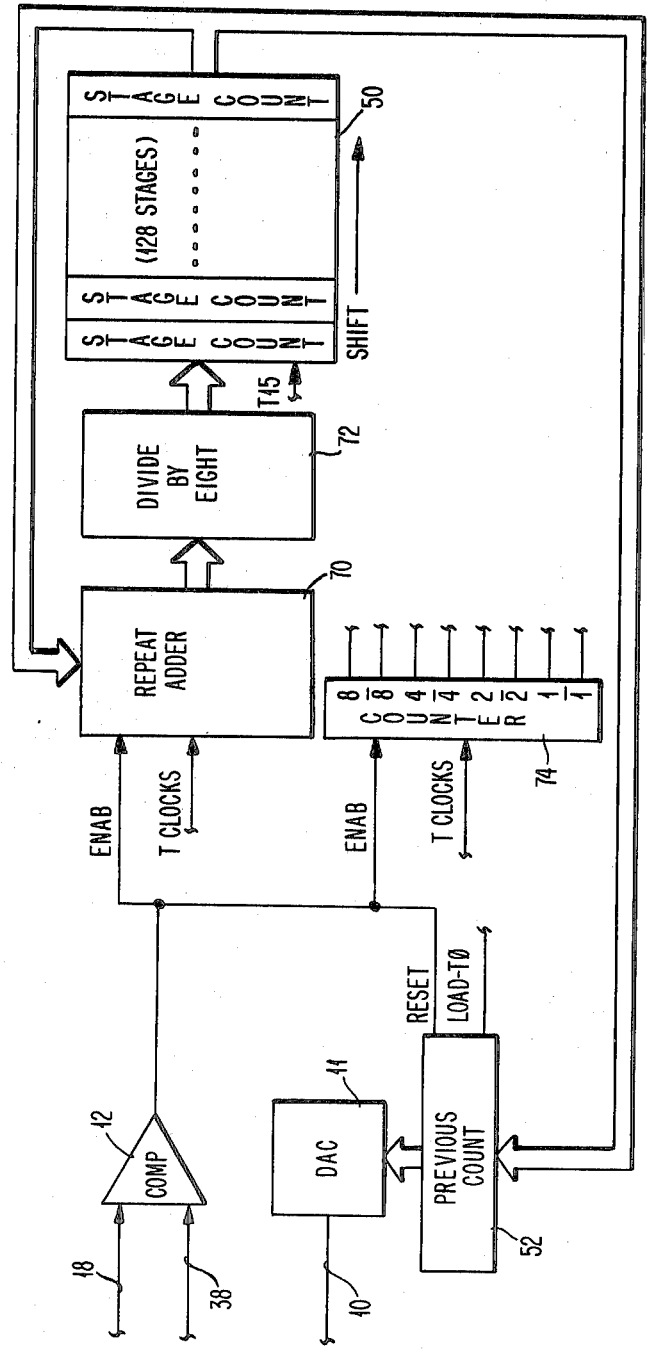
FIG. 3 illustrates an embodiment in which the sensor is readjusted to a new count computed to make the changed count as much different as required in the particular design.
Figure 4:
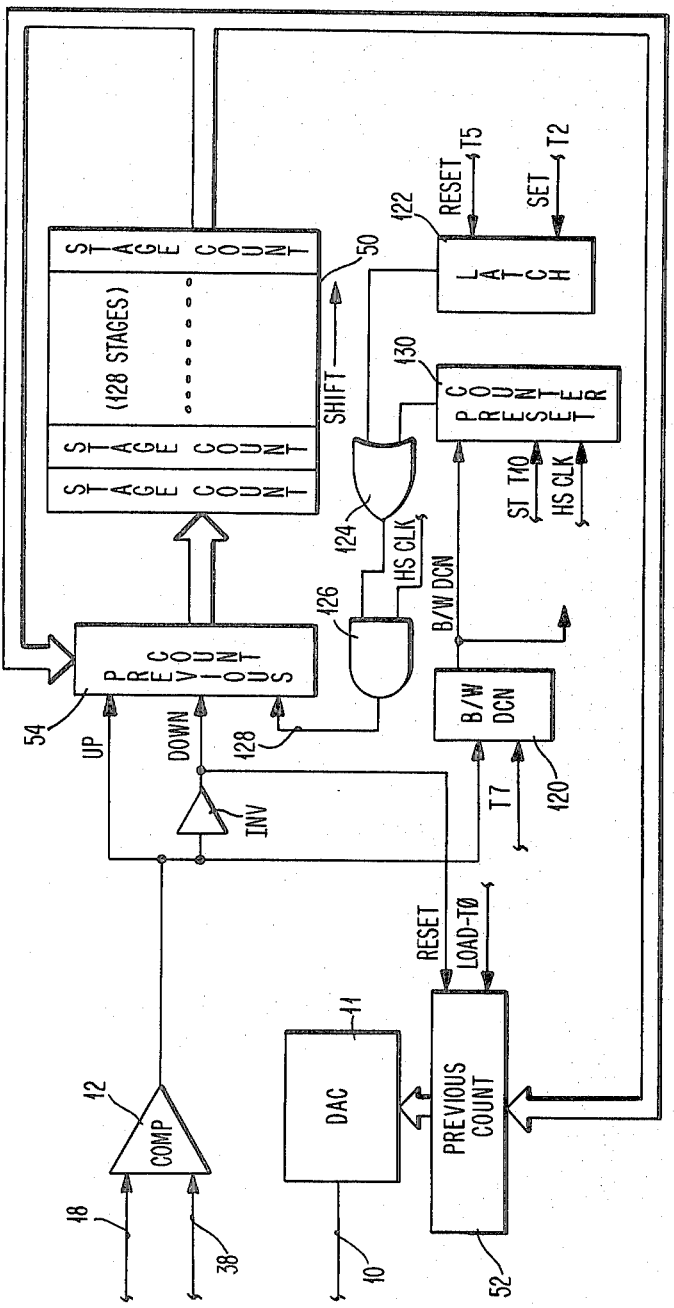
FIG. 4 illustrates an embodiment in which ordinarily the total increment is one count while at certain extremes of operation the increment is more than one count.

Line 8 is also one input to an amplifier including FET 14. FET 14 is in a voltage divider including resistor 16 and is proportionally gated on by the signal on line 8. Potential +V is applied to one side of transistor 14 and potential −2 V is applied through resistor 16 to the other side of transistor 14, to which line 18 connects as one input to comparator 12 (FIGS. 2, 3 and 4). This potential varies between −2 V and +V depending on the degree to which FET 14 is gated on.

A substantially identical group of 126 such circuits is provided having diodes 20, capacitors 22, switch FETs 24 connected by line 26 through resistance 28 to ground. The diodes 20 are maintained in the dark in all normal events, and the signal on line 26 is a reference signal. The elements operative with dark photodiodes 20 to produce a reference signal on line 26 are substantially identical to those in the light-receiving stage, so that the reference will track all possible environmental variables operative on the light-receiving stage. Both groups of stages receive operating potential +V from line 5.

As with the light-receiving signal, the reference signal on line 26 is an input to comparator 12. That signal is operative on the gate of FET 34, in a voltage divider including resistor 36. This voltage divider is essentially identical to that operative with line 8, and a reference signal is produced on line 38 as the second input to comparator 12.

A ready signal to shift register 1 conditions the shift register for operation. As is conventional, such a signal is generated when the array is physically brought to a start position, such as the next column to be scanned. A shift clock then produces pulses at regular intervals. A signal-control pulse or high signal enters stage 1, thereby closing the switch 6 in the stage controlled by the first stage of shift register 1 and the switch 24 in the associated reference circuit. During this period any charge lost by capacitor 4 while switch 6 was open is replaced through information line 8. In a similar manner any charge lost by capacitor 22 is replaced from reference line 26 through switch 24. Since symmetry is maintained for all conditions save the optical signal, the difference in the charge replaced via lines 8 and 26 is that caused by the optical signal received on diode 4 since the previous recharging. Since the information line 8 and reference line 26 are terminated in the gates of FETs 14 and 34 and high resistances 9 and 28, the relative charges reflect differential voltages to the comparator 12, with the recharge current into to the capacitor 4 controlled by the status of the digital-to-analog converter 11 as will be described.

At the next subsequent shift pulse, the control pulse shifts to stage 2 of shift register 1. Switches 6 and 24 of the first stage of the sensor are switched off, as are all of the switches corresponding to switches 6 and 24 of all of the stages except stage 2. The switches of stage 2 corresponding to switches 6 and 24 are closed under control of the pulse in stage 2 of shift register 1. Signals to comparator 12 are generated as described in connection with stage 1. This continues sequentially at regular intervals, resulting in a row of contiguous diodes 3 scanning a row of contiguous pels.

In accordance with this invention, undesirable effects of the inherent variables among the individual sensing operations are compensated for or avoided. Such variables include differences in the paper or other substrate being examined, differences in ambient light, variations in component responses, and the effects of dimensional imperfections. Moreover, this invention provides primarily for digital definition and transmission of data, which reduces error.

A preferred embodiment is shown in FIG. 2. Lines 18 and 38, the two inputs to comparator 12, produce a high output when the signal on line 18 is higher than that on line 38, representative of a substantially greater discharge of capacitor 4 by corresponding light-receiving diode in FIG. 1. Each stage of scanner 1 (FIG. 1) has an associated count stored in a stage of memory 50, and these stages are shifted in memory 50 in synchronism with the stage in the scanner switched on.

Basic timing of the system is obtained by dividing the time between shift pulses into sixteen, equally spaced clock pulses T$\emptyset$-T15. The system also has a high speed clock (HS CLK), operating at twice the intervals between the T clock times (such as the interval between T$\emptyset$ and T1).

At time T$\emptyset$ the count in the outer stage of memory 50 is the previous count for the location being scanned. The count is entered into register 52. At an early time, T$\emptyset$ or T1, it is also entered into up-down counter 54. Counter 54 is enabled for counting by a positive enable input (ENAB). The counter counts up in response to a clocking signal when the output of comparator 12 is high, indicative of light having substantially activated the associated photodiode of the scanner. When the output of comparator 12 is low, counter 54 counts down in response to the said clocking signals. The time at which a single clock pulse is connected as a controlling input to counter 54 during each scan period is T13. (Counter 54 is inhibited when full or empty so as to be incapable of counting past its maximum or beyond zero.)

The output of register 52 is the input to digital-to-analog converter 11. DAC 11 produces a constant current signal directly corresponding to the count applied to its input. That signal defines the current into the discharged capacitor 4. When a capacitor 4 is recharged to the voltage V, the voltage to the gates of transistors 14 and 34 (FIG. 1) are identical and the output of comparator 12 goes low. The input to DAC 11 is caused to go to a count of zero by a reset signal to memory 52, limiting the charging current.

Counter 56 defines a digital output which is directly related to the black or white decision of the circuit. It receives high-speed clock signals until the output of comparator 12 goes low.

A final high total of counter 56 is generally representative of a white decision. A final low total of counter 56 is generally representative of a black decision. A predetermined high count value can be selected as indicative of white, with all lower values considered black. This can be implemented by very simple combinational logic. Further sophistication in the black/white decision making procedure can be achieved by taking into account the degree of variation of the prior signal from the present signal. Variations considered insignificant are defined upon consideration of the printing mechanism, ink, and other elements to be encountered. Then the decision taking into account only significant variations is stored in data processing memory. This is interrogated by standard table-look-up techniques, in which the prior count and the present count are the two variables to a black or white decision stored in the table. When considerable random variations in optical response can be expected, the maximum count for white and minimum count for black at which the next prior status of black or white was found is more significant than the immediately preceding count. Peak-hold logic can be employed to hold the highest count in a series of white decisions and the lowest count in a series of black decisions as the preceding count to be compared.

This invention is not directed to such sophistication in the black/white decision making. Accordingly, that function is illustrated simply a black/white decision logic 58. The white decision signal is also employed as an enable signal as will be described.

In one mode of operation, the circuit of FIG. 2 may be employed in a calibrate and run mode. In this case the ENAB signal is applied by means such as an external switch to enable counting. The original counts in memory may be any random amount. During calibrate, an entirely white column is scanned. The output of comparator 12 will be high for a time for each pel. If the previous count, inserted in register 52 and counter 54 happens to be too low, recharge will continue through time T13 and the T13 pulse will increment the count in counter 26 up. That count is then stored as the last stage count of memory 50, and all stages of memory 50 are shifted. Reading of the next pel then occurs with the output count from memory 50 being the new final stage. The count in counter 54 will be incremented up if the output of comparator 12 is high at T13 and down if that output is low at T13.

This continues for all 128 stages, each associated with one of the 128 photodiodes in the scanner. The first photodiode is then re-examined, and in this calibration mode it will be subjected to white. The counter 26 will be incremented up or down as described depending on the status of the output of comparator 12 at T13.

After sufficient time, the count for each diode will be brought to a value representing the proper level for reading white. Assuming no further compensation is required, the count will then alternate between up one and down one.

Counter 54 is then disabled by causing the ENAB signal to go low. The count for a white document will therefore be retained regardless of output, with dark areas resulting in transition of comparator 12 at an earlier time (e.g., T8).

A second preferred mode of operation uses the black/white decision from logic 58 to enable counter 54.

If the decision is white, counter 54 is enabled to count up or down one count at T13. Operation is the same as the calibration mode described employing an external enable signal. If the decision is black, the enable signal is down and counting is inhibited, thus holding the calibrated count for white. By this means, changes in the white areas (such as paper reflectance) are averaged and compensated for in a continuous and automatic manner without interaction from dark areas.

It will be readily apparent to those familiar with circuit implementation that the system disclosed may be implemented in many different ways within ordinary skill and that the drawing is largely illustrative. In particular standard circuit modules are typically employed based upon currently availability and economic factors. A number of clocking, timing, and direct interconnections are typically used to assure that the interconnections occur when the proper status has been assumed by a circuit element. Such considerations are matters of straightforward, conventional circuit design and will not be mentioned in further detail.

FIRST ALTERNATIVE: CONTINUOUS CALIBRATION AT CENTER TIME

Because of its simplicity, the circuit shown in FIG. 2 is generally preferable for high-contrast optical character recognition applications. For other applications modifications may prove desirable. One such possible modification is shown in FIG. 3 to illustrate the scope of the invention. Elements and interactions are essentially identical to those of the embodiment of FIG. 1 and FIG. 2 unless otherwise specifically noted.

In this embodiment, the charge to be replaced is computed such that, for a constant optical signal, replacement will occur at a defined point in the center of the interval (e.g., T8) at the next time a given pel is sampled regardless of the error in the given sample interval.

The previous count from a stage is read from the last stage of memory 50 into repeat adder 70 and also into register 52 as in the previous embodiment. Repeat adder 70 receives an enable signal from comparator 12 when that output signal is up.

With repeat adder 70 enabled, each T clock signal of the sixteen of a cycle results in the addition of the count from memory into the previous sum from such addition. For example, if the enable signal exists for periods including T0 and T1, the previous count will be added to zero at T0 and to itself at T1. More generally, if the enable signal remains for X T-time periods, the amount in repeat adder 70 will be X times the previous count.

The output of counter 70 is applied to divided-by-eight circuit 72. Such division of a binary number may be by three column shift, as is well understood. This divided output is entered into the first stage of shift memory 50 at T15, the last time period of a cycle.

At the same time a counter 74, operative as part of the black-white decision elements, receives an enable signal from comparator 12 when it is up and receives all of the T clock pulses. When the enable signal is up, the count of counter 74 increases. In the specific embodiment, counter 74 operates in binary notation. In one cycle, counter 74 can receive a maximum of sixteen T clock pulses. The circuit is designed to continually center the response with the enable signal terminating between T7 and T8, and counter 74 thereby reaching a count of eight.

In this mode, the value in counter 74 represents the derivitive of the brightness gradient across the column line with a count of 8 equal to no gradient; larger numbers a gradient toward white; and lower numbers a gradient toward black. By definition, the true edge of an optically defocused image is at the maximum derivitive of the gradient, therefore peak detection of the singal will determine the theoretical "edge" of the image.

The described circuit implements the equation: New Count = Prior Court × Enable Period ÷ 8. This equation may be understood by recognizing that 8 represents one half the maximum time period of 16 T signals, and that recharge current is directly proportional to the counts. According, Prior Count times the Prior T signals represents the total charging required, while the objective is to achieve the total charge in 8 T signals. Stated more generally, Prior Current × Prior Charging Time = New Current × One-Half Maximum Time. Solving: New Current = Prior Current × Prior Charing Time ÷ One-Half Maximum Time. This may be implemented by a simple digital computer or by the repeating circuitry shown in FIG. 3.

SECOND ALTERNATIVE: MULTIPLE COUNT CHANGE PER CYCLE

The embodiment shown in FIG. 2 provides for very slow recharge current adjustment for brightness changes (one count per scan maximum), while the circuit shown in FIG. 3 provides for large jumps. By modification of number and spacing of clock pulses applied to counter 54, circuit response to changes in brightness may be obtained which is intermediate to those of FIGS. 2 or 3.

As with the embodiment of FIG. 3, such adjustment may prove desirable for selected applications. The embodiment shown in FIG. 4 is one such modification which provides two stable points on each side of a gap between the black/white decision point. The circuit thus tends to stabilize the output from comparator 12 a predefined time (therefore reflectance) from the black/white decision point thereby requiring a predetermined reflectance change to switch from black to white and vice versa. This provies a noise margin to preclude ordinary noise and the like from causing transition.

Elements and interaction of the embodiment of FIG. 4 are essentially identical to those of the preferred embodiment of FIGS. 2 and 3 unless otherwise specifically noted. As in those embodiments, the maximum recharging period is 16 T-time intervals.

As with the preferred embodiment, the previous count for a stage is read from the last stage of memory 50 into up-down counter 54 and also into register 52. Counter 54 receives an up control signal from comparator 12 when that output signal is up. When that output signal is down, that signal produces a down control input to counter 54.

Black or white decision logic 120 (B/W DCN) receives both the output of comparator 12 and the T7 clock pulse, a pulse near the middle of a full clock cycle. When the comparator output is still high at T7, B/W DCN comes up, defining a white decision.

Latch 122 is set at T2 and reset at T5. When latch 122 is set, it is a high input to OR logic 124, and a high signal is applied to AND logic 126. The high speed clock (HS CLK) is the second input to AND 126, having a frequency of twice the time between T clock time. Accordingly, during each time T2 through T5, AND 126 is satisfied by six HS CLK signals, and the output produces six spaced pulses on line 128. The pulses step counter 54 up or down according to whether the up control signal or the down control signal is operative.

Preset counter 130 is started by the T10 pulse. When started, it produces a high output until counted to overflow by HS CLK signals, at which point counting stops and the output is low until the next T10 pulse. When B/W DCN is low, indicative of a black decision, counter 130 is preset to a value at which the counter will overflow at five HS CLK pulses occurring after T10. This causes OR 124 to produce a high signal to AND 126 which will result in five pulses from AND 126 to counter 54. When B/W DCN is high, indicative of a white decision, counter 130 is preset to a value at which the counter will overflow at seven HS CLK pulses occurring after T10. This causes OR 124 to produce a high signal to AND 126 which will result in seven pulses from AND 126 to counter 54.

In operation, when the output of comparator 12 is up relatively briefly, ending for example at T2, then counter 54 is controlled to count down. The six pulses from AND 126 during the time defined by latch 122 each step counter 54 down. Similarly, the five pulses from AND 126 during the time from T10 defined by preset counter 130 also step counter 54 down. Conversely, if the output of comparator 12 is up a relatively long period, ending for example at T14, the six pulses defined by latch 122 and the seven pulses of counter 130 step counter 54 up (the B/W DCN being up, thereby changing the preset of counter 130 to produce seven pulses). The circuit is designed so that a change of count in the order of magnitude of thirteen will bring the operating point for the brightest pel to near the center of the clock cycle.

When the output of comparator 12 goes down at T6, counter 54 counts up six during T2 to T5 as the up control is high. Counter 54 counts down five after T10 because the down control is then high. At the next reading of that stage the count in register 52 is therefore one higher. If the pel is again black, the time that comparator 12 is no longer high is less than T6. The circuit is designed so that each such change in time is about the period between HS CLK pulses. Then, after a few repeated operations of the same stage for the same brightness pel, the output comparator 12 goes down shortly before T5. The last pulse from AND 126 under control of latch 122 then results in a down increment. The five pulses under control of counter 130 combine with that pulse to achieve equilibrium, six up pulses and six down pulses.

When the repeated pel brightness is white (B/W DCN up), counter 130 produces seven pulses. The circuit stabilizes with the output of comparator 12 going down after T10, so that the first counter under control of counter 130 has the same up significant to counter 54 as the six pulses under control of latch 122.

This circuit requires no prior designation of a black or white status. The first few bits of data are ignored as unreliable.

In all of the embodiments, the previous count is used only to change the recharge current from the DAC. This count can simultaneously be used to change light value of scanning illumination. Thus, in the embodiment of FIG. 1, a high count in register 52 may improve somewhat the accuracy of response of some digital-to-analog converters. Where the count is below a predetermined value, this can be used in each cycle to increase by a given increment, the power to and thereby the illumination of the light source. The entire system will thereby stabilize as to illumination when the count in register 52 is higher than that predetermined value.

What is claimed is:

1. An electrical measuring apparatus in which a current acceptor has one current-accepting limit after a first status sensed by said system and a substantially different current-accepting limit after a second status sensed by said system wherein the improvement comprises means to store a count representative of said current-accepting limit after a prior sensing, means to charge said current acceptor in an amount corresponding to the magnitude of said count such that said acceptor will be fully charged in a predetermined time when said current-accepting capacity corresponds to that represented by said count, timing means to time said charging, and means controlled by said timing means to change said count at least one increment when the said timing means measures a time to charge substantially different from said predetermined time.

2. The measuring apparatus as in claim 1 having means to enable said means to change said count only when said apparatus observes a selected one of said first status or said second status.

3. The measuring apparatus as in claim 1 wherein said means controlled by said timing means has means to produce the sum of each prior count added to itself once again for each of even intervals of the maximum charging time during which said charging continues and to divide said sum by a one-half the number of intervals of the maximum charging time, and means to store that result of as said changed count.

4. The measuring apparatus as in claim 1 also comprising means to signal the status sensed during the prior sensing, and wherein said means controlled by said timing means comprises means to produce a first plurality of incrementing signals in a time series starting at a time spaced in one direction in time from the center of the maximum charging time and means to produce a second plurality of incrementing signals in a time series starting at time spaced in the opposite direction in time from said one direction from the center or said maximum charging time, said second plurality being one less than said first plurality of incrementing signals when said means to signal status signals said first status and one more than said first plurality of incrementing signals when said means to signal status signals said second status, incrementing means holding said previous count initially in each charging operation and receiving said incrementing signals to increment in one direction during the time of said charging and then to increment in the opposite direction.

5. The measuring apparatus as in claims 1, 2, 3 or 4 also comprising a count-controlled digital-to-analog converter connected to control current to charge said current acceptor and means to apply said count to control said converter, said timing means thereby measuring the time to charge said acceptor with current as defined by said converter.

6. The measuring apparatus as in claim 5 comprising a plurality of said current acceptors, each connected to elements as described and also comprising a memory with a plurality of stages corresponding to the number of said current acceptors and each storing the said count for one of said current acceptors, and means to shift said counts in said memory to output the counts serially.

7. The measuring apparatus as in claim 2 wherein said means controlled by said timing means comprises incrementing means holding said previous count initially in each sensing interval and adapted to increment a single increment at a time in a sensing interval, said increment being in one sense when said charging is continuing at said time and in the opposite sense when said charging is completed at said one time.

* * * * *